United States Patent
Romanovskiy

(10) Patent No.: US 9,612,774 B2
(45) Date of Patent: Apr. 4, 2017

(54) METADATA STRUCTURES FOR LOW LATENCY AND HIGH THROUGHPUT INLINE DATA COMPRESSION

(71) Applicant: EMC Corporation, Hopkinton, MA (US)

(72) Inventor: Alexey Valentinovich Romanovskiy, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/770,566

(22) PCT Filed: Dec. 23, 2014

(86) PCT No.: PCT/RU2014/000971
§ 371 (c)(1),
(2) Date: Aug. 26, 2015

(87) PCT Pub. No.: WO2015/199577
PCT Pub. Date: Dec. 30, 2015

(65) Prior Publication Data
US 2016/0364180 A1    Dec. 15, 2016

Related U.S. Application Data

(63) Continuation-in-part of application No. PCT/RU2014/000470, filed on Jun. 27, 2014.

(51) Int. Cl.
*G06F 12/00* (2006.01)
*G06F 3/06* (2006.01)

(52) U.S. Cl.
CPC ............ *G06F 3/0661* (2013.01); *G06F 3/064* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,300,823 B2 | 10/2012 | Bojinov et al. | |
| 8,386,444 B2 | 2/2013 | Kraus et al. | |
| 8,645,337 B2 * | 2/2014 | Kapoor | G06F 17/30501 707/693 |
| 2004/0064327 A1 | 4/2004 | Humenansky et al. | |
| 2006/0195881 A1 * | 8/2006 | Segev | H04N 21/23439 725/116 |
| 2014/0095458 A1 | 4/2014 | Kim et al. | |

* cited by examiner

*Primary Examiner* — Brian Peugh
(74) *Attorney, Agent, or Firm* — BainwoodHuang

(57) ABSTRACT

Improved techniques of managing storage in a data storage system involve compressing a subset of block and macroblock metadata. Advantageously, a data storage system operating according to the improved techniques is able to store more metadata in volatile memory even for huge data objects.

20 Claims, 11 Drawing Sheets

Fig. 2B

Second Segment

| #9 | #10 | #3 | #11 | | | | | |
|---|---|---|---|---|---|---|---|---|

70(b)

| | | 88(f) Active Data Block | | | | | |
|---|---|---|---|---|---|---|---|
| | | 88(g) Active Data Block | | | | | |
| 60 | 60 | | 60 | 60 | 60 | 60 | 60 |
| | | 88(h) Active Data Block | | | | | |
| | | 88(i) Active Data Block | | | | | |
| Macroblock 1 | Macroblock 2 | Macroblock 3 | Macroblock 4 | Macroblock 5 | Macroblock 6 | Macroblock 7 | Macroblock 8 |

58(d)

| 6,144 bytes | 6,144 bytes | 6,144 bytes | 6,656 bytes | 6,144 bytes | 0 | 0 | . . . |
|---|---|---|---|---|---|---|---|

| 88(a) Active Data Block | 88(e) Active Data Block | 58(d) Metadata | | | | | |
|---|---|---|---|---|---|---|---|
| | | 92(a) | | | | | |
| 88(b) Active Data Block | 88(j) Active Data Block | 92(b) | | | | | |
| 88(c) Active Data Block | 88(k) Active Data Block | 92(c) | | | | | |
| | | 92(d) | | | | | |
| 88(d) Active Data Block | 88(l) Active Data Block | 92(e) | | | | | |
| Macroblock 9 | Macroblock 10 | Macroblock 11 | Macroblock 12 | Macroblock 13 | Macroblock 14 | Macroblock 15 | Macroblock 16 |

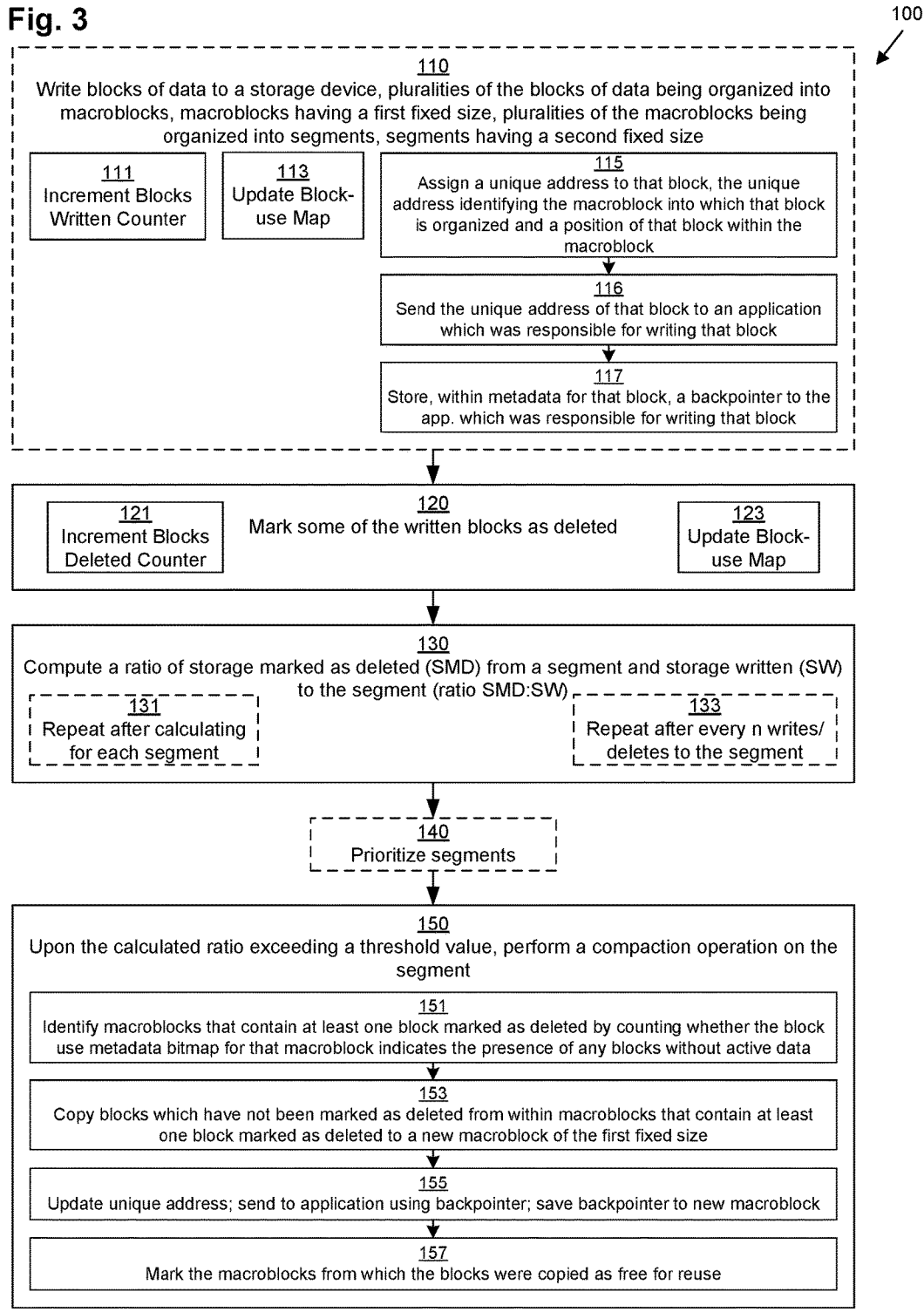

Fig. 4b
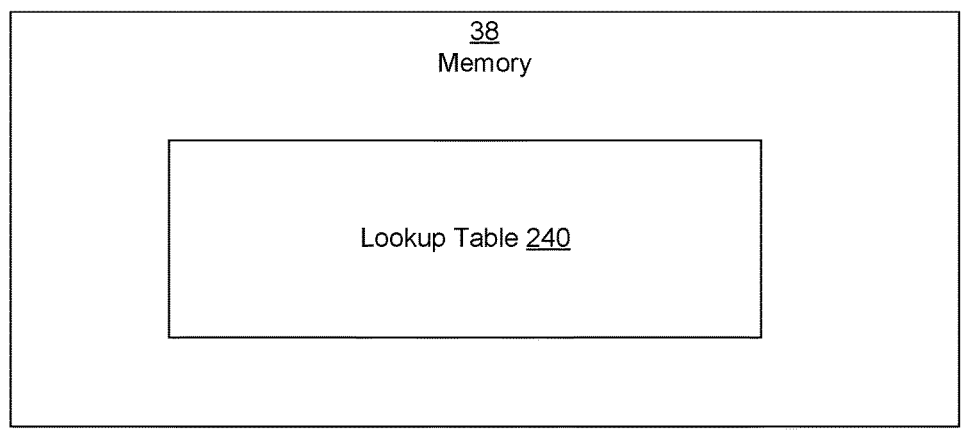
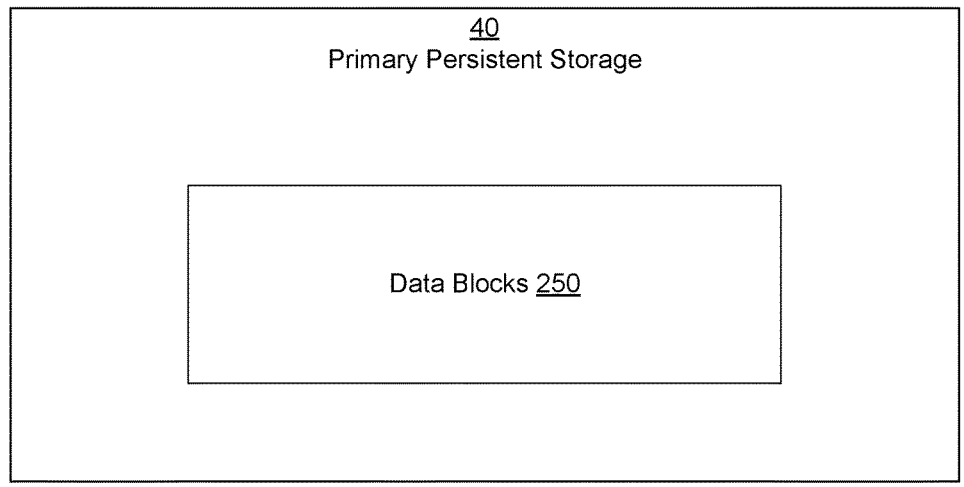

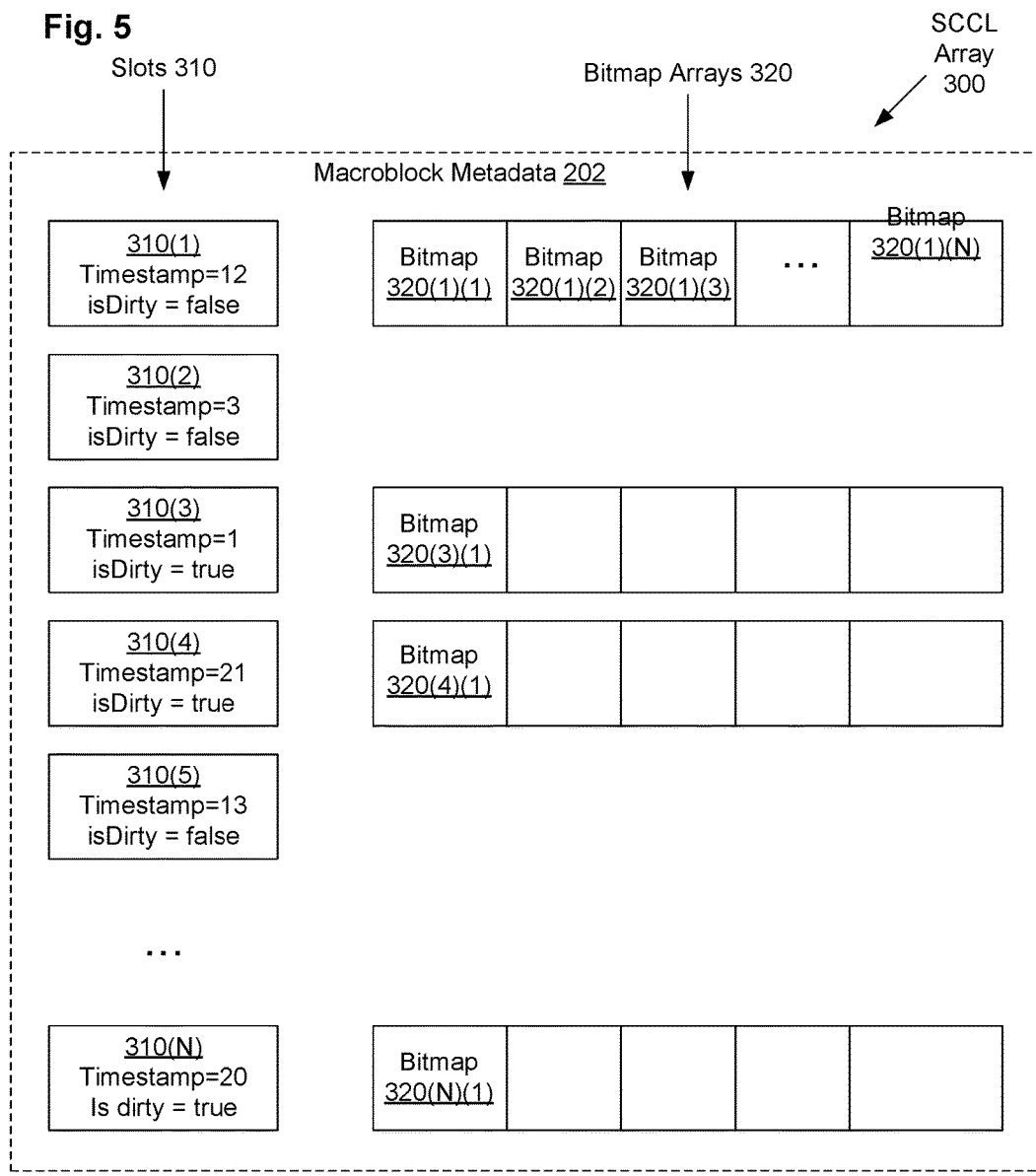

Backpointer Array 630 recovered from storage device
and decompressed using IC Key

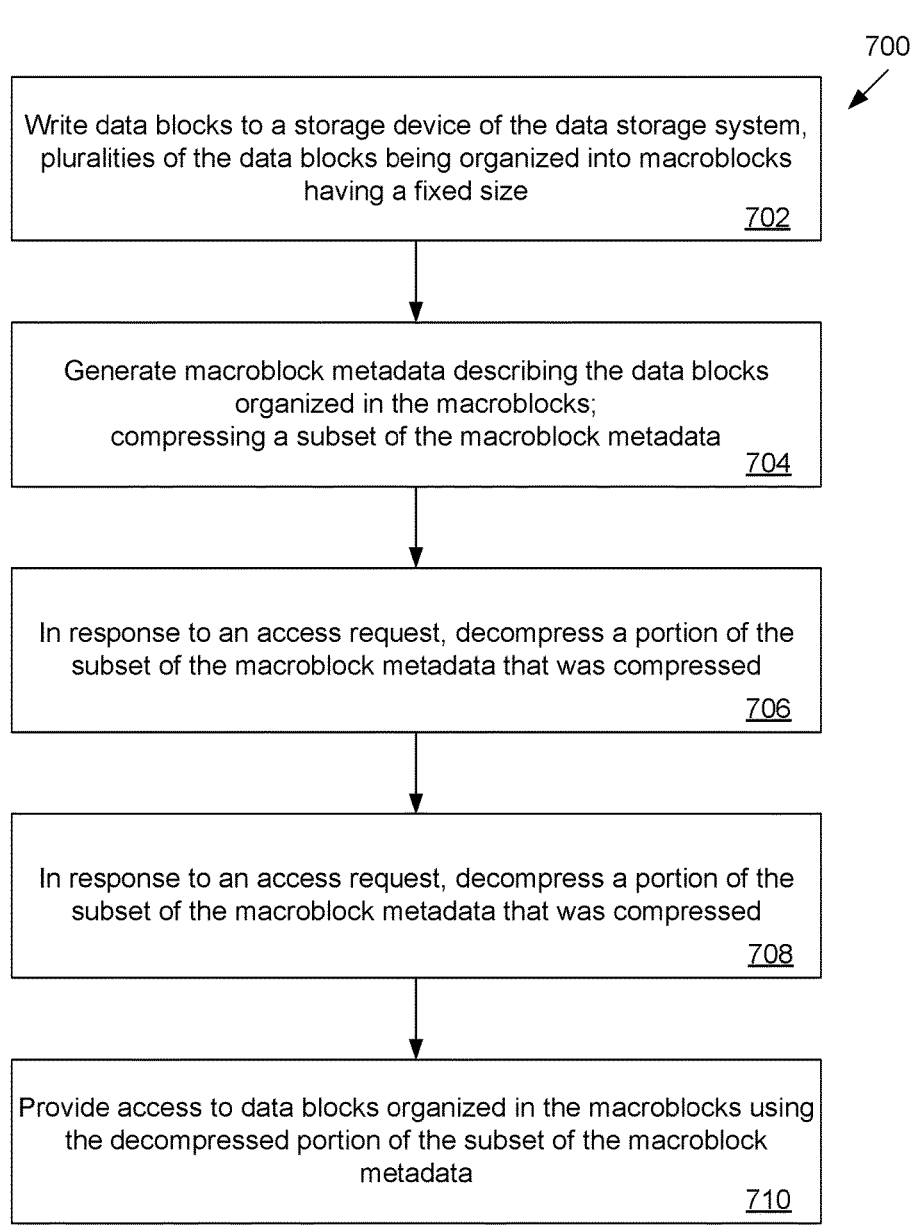

METADATA STRUCTURES FOR LOW LATENCY AND HIGH THROUGHPUT INLINE DATA COMPRESSION

BACKGROUND

Data storage systems are arrangements of hardware and software that include storage processors coupled to arrays of non-volatile storage devices. In typical operation, storage processors service storage requests that arrive from client machines. These storage requests may specify files or other data elements to be written, read, created, or deleted. The storage processors run software that manages incoming storage requests and performs various data processing tasks to organize and secure the data stored on the non-volatile storage devices.

Some data storage systems store data in discrete units called data blocks and provide each data block with a physical address in storage. Such block-based data storage systems have metadata to describe the data stored in the blocks. The speed of such data storage systems may be optimized by sequentially writing data blocks, similar to a log-structured file system.

SUMMARY

An approach to organizing data in a data storage system involves arranging data blocks in macroblocks that provide a sequential address space for the data blocks. The blocks and then macroblocks in which the data blocks are arranged have their own metadata describing the data blocks stored in the macroblocks. Such an approach allows easy block compression.

Unfortunately, the above-described approach may suffer from deficiencies. To maintain the speed of a data storage system, the block and macroblock metadata is stored in volatile memory. However, the block and macroblock metadata takes up too much space in volatile memory when they store large numbers of data blocks.

In contrast to the above-described approach to organizing data in a data storage system in which there is too much metadata to fit into memory, improved techniques of managing storage in a data storage system involve compressing a subset of block and macroblock metadata. Advantageously, a data storage system operating according to the improved techniques is able to store more metadata in volatile memory even for huge data objects.

One embodiment of the improved techniques is directed to a method of managing storage in a data storage system. The method comprises writing data blocks to a storage device of the data storage system, pluralities of the data blocks being organized into macroblocks having a fixed size. The method also comprises generating block and macroblock metadata describing the data blocks organized in the macroblocks. The method further comprises compressing a subset of the block and macroblock metadata. The method further comprises, in response to an access request, decompressing a portion of the subset of the block and macroblock metadata that was compressed. The method further comprises providing access to data blocks organized in the macroblocks using the decompressed portion of the subset of the block and macroblock metadata.

Other embodiments are directed to a system, a computerized apparatus, and a computer program product for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2B depicts a revised example block layout upon performance of a method according to various embodiments.

FIG. 3 depicts an example method according to various embodiments.

FIG. 4b depicts example block metadata within the data storage system shown in FIG. 4a according to various embodiments.

FIG. 5 depicts an example macroblock metadata structure within the data storage system shown in FIG. 4a according to various embodiments.

FIG. 9 depicts another example method according to various embodiments.

DETAILED DESCRIPTION

This specification is organized into three sections. The first section provides a general discussion of the data storage system that implements the improved techniques. The second section describes a data storage system implementing a garbage collection or defragmentation system to allow fragmented macroblocks to be combined with other fragmented macroblocks, thereby allowing macroblocks to be freed. The third describes a data storage system implementing compression of block and macroblock metadata.

1. Introduction

Figure 1:
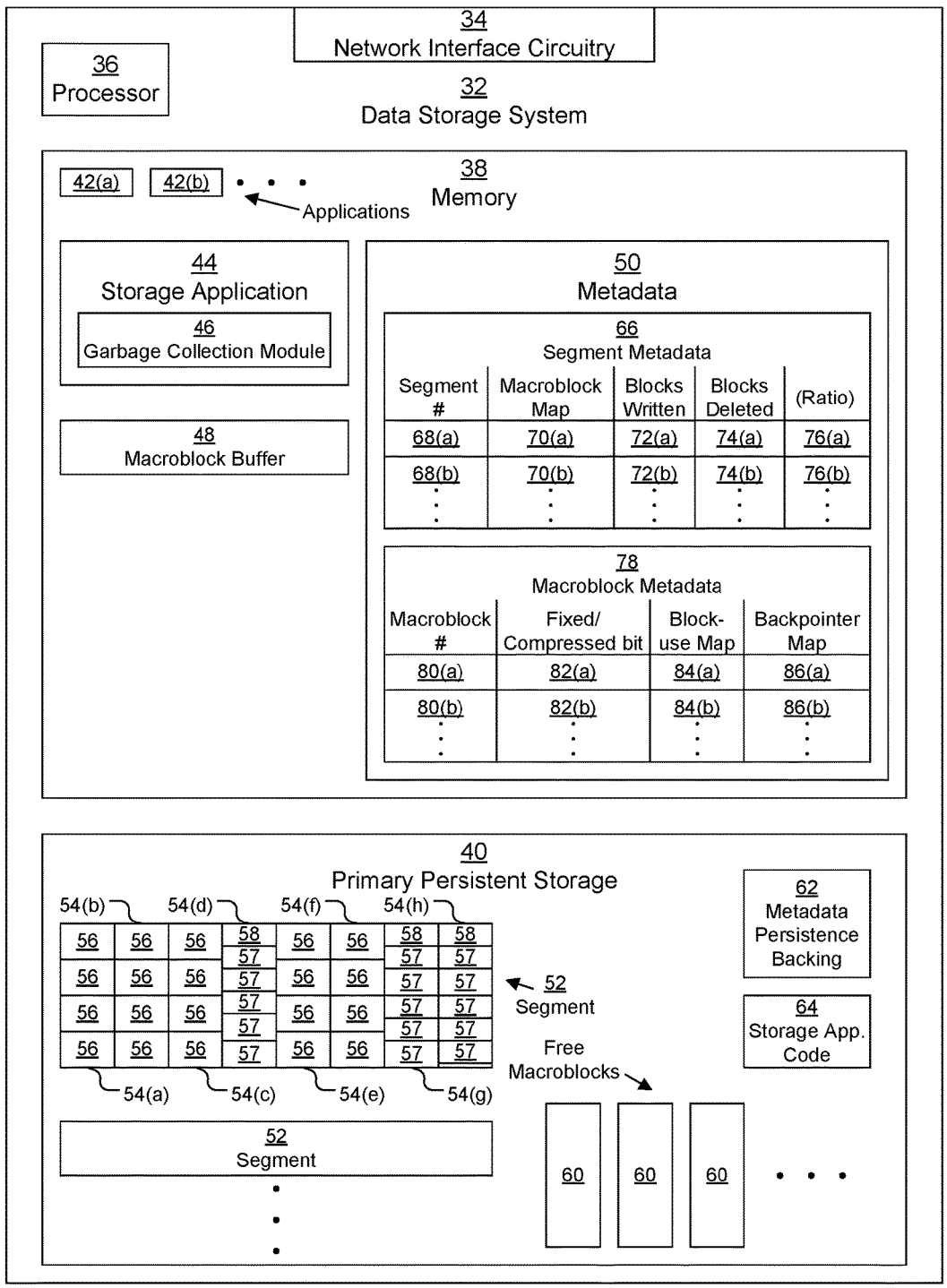
FIG. 1 depicts an example data storage system according to various embodiments.

FIG. 1 depicts an example data storage system (DSS) 32. DSS 32 may be any kind of computing device that provides storage, such as, for example, a personal computer, a workstation computer, a server computer, an enterprise server computer, a laptop computer, a tablet computer, a smart phone, etc. Typically, however, DSS 32 will be a data storage array, such as, for example, a VNX®, VNXe®, or CLARiiON® CX4 data storage array provided by the EMC Corporation of Hopkinton, Massachusetts.

DSS 32 includes a processor, 36, system memory 38, and primary persistent storage 40. In some embodiments, DSS 32 also includes network interface circuitry 34 for communicating with one or more host devices configured to send data storage commands to the DSS 32. Network interface circuitry 34 may include one or more Ethernet cards, cellular modems, Wireless Fidelity (WiFi) wireless networking adapters, any other devices for connecting to a network, or some combination thereof.

Processor 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 36 may also include processing circuitry configured to control and connect to the primary persistent storage 40.

Memory 38 may be any kind of digital system memory, such as, for example, random access memory (RAM). Memory 38 stores an operating system (OS) (not depicted, e.g., Linux, UNIX, Windows, or a similar operating system) and one or more applications 42 (depicted as applications 42(*a*), 42(*b*), . . .) executing on processor 36 as well as data used by those applications 42.

It should be understood that network interface circuitry 34, processor 36, and memory 38 interconnect, and they all may reside on a storage processor board or motherboard of the DSS 32. There may be multiple independent storage processor boards per DSS 32, arranged in a highly-available fault-tolerant manner.

Primary persistent storage 40 may be made up of a set of persistent storage devices, such as, for example, hard disk drives, solid-state storage devices, flash drives, etc. Primary persistent storage 40 is configured to store blocks 56, 57 of data within macroblocks 54 so as to be easily accessible to applications 42 via storage application 44. In some embodiments, DSS 32 may include (or otherwise have access to) secondary persistent storage (not depicted), which is used for secondary purposes, such as backup. Secondary persistent storage may include, for example, tape or optical storage.

Memory 38 also stores a storage application 44 as it executes on processor 36, as well as a macroblock buffer 48 and metadata 50. Storage application 44 is an application that receives and processes storage commands from applications 42 (or, via network interface circuitry 34, from other applications executing on remote host devices) that are directed to the primary persistent storage 40. Part of storage application 44 is a garbage collection module 46, which is configured to perform defragmenting garbage collection on primary persistent storage 40 with reference to the metadata 50. In some embodiments, metadata 50 may be backed up onto metadata persistence backing 62 on primary persistent storage 40 or some other non-volatile storage.

Typically, code for the OS, applications 42, storage application 44, and garbage collection module 46 is also stored within some form of persistent storage, either on a dedicated persistent boot drive or within the primary persistent storage 40, so that these components can be loaded into system memory 38 upon startup. An application or module 42, 44, 46, when stored in non-transient form either in system memory 38 or in persistent storage, forms a computer program product. The processor 36 running one or more of these applications of modules 42, 44, 46 thus forms a specialized circuit constructed and arranged to carry out various processes described herein. Code for storage application 44 is depicted as being stored as code 64 within primary persistent storage 40.

Storage application 44 stores data blocks received from applications 42 as either uncompressed blocks 56 or compressed blocks 57 on primary persistent storage 40. Typically, storage application 44 stores these blocks 56, 57 in sequential order within a macroblock 54 and writes macroblock metadata 78 regarding each macroblock 54 to memory 38 within metadata 50.

Each macroblock 54 is a contiguous region of storage (i.e., having contiguous addresses) within primary persistent storage 40. In addition to used macroblocks 54, primary persistent storage 40 may also include a set of free macroblocks 60, which are not currently allocated to store any data blocks 56, 57. Typically, all macroblocks 54, 60 have a fixed size, and uncompressed blocks 56 have a different, smaller, fixed size. In one embodiment, each macroblock 54, 60 is 64 kilobytes in size, which allows it to store eight 8-kilobyte uncompressed blocks 56. In another embodiment, each macroblock 54, 60 is 1 megabyte in size, which allows it to store sixteen 64-kilobyte uncompressed blocks 56. However, as depicted, for the sake of simplicity, each macroblock 54, 60 can store four blocks 56 (for example, each macroblock 54, 60 is 32 kilobytes, capable of storing four 8-kilobyte blocks 56).

In some embodiments, instead of storing uncompressed data blocks 56, some of the macroblocks 54 may be configured to store several compressed blocks 57. In such embodiments, these macroblocks (e.g., 54(*d*), 54(*f*), 54(*h*)) configured to store compressed blocks 57 have a header 58 which stores macroblock-level metadata. Typically, a macroblock 54 only stores compressed blocks 57 if there is enough room within the macroblock 54 to store more compressed blocks 57 than it could store uncompressed blocks 56. Thus, since, as depicted, a macroblock 54, 60 can store four 8-kilobyte uncompressed blocks 56, a macroblock 54 only stores compressed blocks 57 if it can hold at least five compressed blocks 57 (see, e.g., macroblocks 54(*d*), 54(*f*), 54(*h*)).

Each allocated macroblock 54, 60 has associated macroblock metadata 78. Typically, primary persistent storage 40 is divided in advance into a fixed number of macroblocks 54, 60. In some embodiments, primary persistent storage 40 is configured to store up to eight petabytes ($2^{53}$ bytes) of application data. Thus, in embodiments having a fixed macroblock size of 1 megabyte ($2^{20}$ bytes), each macroblock 54, 60 has an associated 33-bit macroblock number 80 (depicted as macroblock numbers 80(*a*), 80(*b*), . . . ), representing numbers from zero to $2^{33}$-1. Similarly, in embodiments having a fixed macroblock size of 64 kilobytes ($2^{16}$ bytes), each macroblock 54, 60 has an associated 37-bit macroblock number 80, representing numbers from zero to $2^{37}$-1. Macroblock metadata 78 is depicted as a table indexed to the macroblock number 80, with several columns for metadata elements 82, 84, 86, although this is by way of example only. In other embodiments, each metadata element 82, 84, 86 may be stored within a separate array indexed by the macroblock numbers 80, and in yet other embodiments, groups of metadata elements (e.g., 82, 84) may be combined into a single such array. (Further details of such a single array will be described in connection with FIG. 4 below.) However, for purposes of simplicity of description, each metadata element 82, 84, 86 will be described as being stored within a column of a table indexed to the macroblock number 80.

Metadata element 82 stores a single bit flag per macroblock 54, 60, which indicates whether (1) the associated macroblock 54 is configured to store uncompressed data blocks 56 or (0) the associated macroblock 54 is configured to store compressed data blocks 57.

Block-use map element 84 stores a bitmap per macroblock 54, 60. Block-use map element 84 stores one bit per block 56, 57 for up to a maximum number of compressed blocks 56 allowed per macroblock 54, 60. In the case of a macroblock 54 configured to store uncompressed blocks 56, only the first few bits are utilized within block-use map element 84. Thus, in one embodiment, block-use map element 84 contains 63 bits, particularly if block-use map element 84 is stored in conjunction with metadata element 82, the metadata element 82 being the first bit of a long 64-bit integer, and the block-use map element 84 being the last 63 bits of the long 64-bit integer. (Further details of such a block-use map will be described in connection with FIG. 4 below.)

In the case of a macroblock 54 configured to store uncompressed blocks 56, only the first four or eight or sixteen (depending on the embodiment) bits of the block-use map element 84 are actually considered. If one of these initial bits of the block-use map element 84 stores a one (1), then the corresponding uncompressed block 56 stores active data, which means it has had data written to it, and it has not yet been deleted or rewritten. If, on the other hand, one of these initial bits of the block-use map element 84 stores a zero (0), then the corresponding compressed block 56 does not store active data, which means it has either been deleted or rewritten. However, any bit after the first four, eight, or sixteen (or whatever number of uncompressed blocks is able to fit in a macroblock 54, depending on the embodiment) bits does not actually represent any block 56 (i.e., that macroblock 54 is only configured to store 4, 8, 16, etc. uncompressed blocks 56, so any bit after those initial bits will be zero by default).

Turning now to the case of a macroblock 54 configured to store compressed blocks 57, only the first m bits are considered, where m represents the number of compressed blocks 57 assigned to that macroblock 54. If one of these first m bits of the block-use map element 84 stores a one (1), then the corresponding compressed block 57 stores active data, which means it has had data written to it, and it has not yet been deleted or rewritten. On the other hand, if one of these first m bits of the block-use map element 84 stores a zero (0), then the corresponding compressed block 57 does not store active data, which means it has either been deleted or rewritten. However, any bit after the first m bits does not actually represent any block 57 (i.e., that macroblock 54 is only configured to store m compressed blocks 57, so any bit after the first m bits will be zero by default). Backpointer map element 86, which is an example of block metadata, stores, for each block 56, 57 within a respective macroblock 54, a pointer back to a block parent data structure of a respective application 42 that was responsible for creating that block 56, 57. The block parent data structure is used by applications 42 to access blocks 56, 57, e.g. to read, delete, or over-write respective blocks 56, 57, to construct files/objects consisting of blocks, etc. Thus, if DSS 32 is configured to store up to eight petabytes ($2^{53}$ bytes) of application data, then the backpointers may each be at least 64 bits, and there should be enough space allocated within macroblock metadata 78 to store up to the maximum number of compressed blocks 57 allowed per macroblock 54 (e.g., up to 63 compressed blocks 57 are allowed, so 63×64 bits=4,032 bit =504 bytes, which may be rounded up to 512 bytes, of storage allocated within the backpointer map element 86 for each macroblock 54). Combining backpointer map elements 86 for several macroblocks 54 to fit into a single block, e.g. 8 kilobytes or 64 kilobytes, one can apply compression to such a block storing a combination of backpointer map elements. Indeed, one could even store backpointer map elements 86 within regular compressed blocks 57 in macroblocks 54 on storage 40.

As storage application 44 stores blocks 56, 57 sequentially within macroblocks 54, storage application 44 may temporarily buffer the macroblocks 54 in macroblock buffer 48 within memory 38. This allows an entire macroblock 54 to be written in one contiguous write operation.

2. Garbage Collection

As storage application 44 stores blocks 56, 57 sequentially within macroblocks 54, storage application 44 organizes the macroblocks 54 into segments 52. Each segment 52 contains a fixed number of macroblocks 54 (which, recall, have a fixed size). Storage application 44 is able to organize the segments 52 with reference to segment metadata 66 within memory 38. Whenever a newly-added macroblock 54 is created by storage application 44, storage application 44 may define a new segment 52 having a respective segment number 68, which indexes into segment metadata 66. Thus, primary persistent storage 40 may be logically organized into a number of segments 52. Recall that, in some embodiments, primary persistent storage 40 is configured to store up to eight petabytes ($2^{53}$ bytes) of application data, and in some embodiments, each macroblock has a fixed size of 1 megabyte, while in other embodiments, each macroblock has a fixed size of 64 kilobytes. In some embodiments in which each macroblock has a fixed size of 1 megabyte, each segment 52 may be configured to contain up to 128 macroblocks 54, for a total fixed segment size of 128 megabytes ($2^{27}$ bytes). In such embodiments, each segment 52 would have an associated 26-bit segment number 68, representing numbers from zero to $2^{26}$-1. Similarly, in some embodiments in which each macroblock has a fixed size of 64 kilobytes, each segment 52 may be configured to contain up to 32 macroblocks 54, for a total fixed segment size of 2 megabytes ($2^{21}$ bytes). In such embodiments, each segment 52 would have an associated 32-bit segment number 68, representing numbers from zero to $2^{32}$-1.

Example segment metadata 66 is depicted as a table indexed to the segment number 68, with several columns for metadata elements 70, 72, 74, 76. In other embodiments, each metadata element 70, 72, 74, 76 may be stored within a separate array indexed by the segment numbers 68, and in yet other embodiments, groups of metadata elements may be combined into a single such array. However, for purposes of simplicity of description, each metadata element 70, 72, 74, 76 will be described as being stored within a column of a table indexed to the segment number 68.

Macroblock map element 70 stores a fixed number of references to the macroblocks 54 which make up each segment 52. Thus, in the embodiment as depicted (in which each segment 52 includes eight macroblocks 54), if a segment 52 having segment number 68(a) contains macroblocks 54(a), 54(b), . . . , 54(h), with respective macroblock numbers 80(a), 80(b), . . . , 80(h), then the macroblock map 70(a) indexed by segment number 68(a) contains the macroblock numbers 80(a), 80(b), . . . , 80(h) in sequence. As storage application 44 inserts each macroblock 54 into a segment 52, storage application 44 inserts the respective macroblock number 80 for that macroblock 54 into the macroblock map element 70 for that segment 52.

Blocks written element 72 is a counter variable which counts the number of blocks 56, 57 which have been written to a segment 52 since it was initialized. Thus, once storage application 44 begins assigning new macroblocks 54 to a new segment 52, the counter is initialized to zero, and storage application 44 increments the counter of the blocks written element 72 for each block 56, 57 within the newly-added macroblock 54.

Similarly, blocks deleted element 74 is a counter variable which counts the number of blocks 56, 57 which have been deleted from a segment 52 since it was initialized. Thus, once storage application 44 begins assigning new macroblocks 54 to a new segment 52, the counter is initialized to zero, and storage application 44 increments the counter of the blocks deleted element 74 for every block 56, 57 that is deleted or rewritten (since rewritten blocks are written to a new location instead of being overwritten, effectively deleting the block at the initial location) from macroblocks 54 organized into that segment 52.

In some embodiments, a ratio 76 of the blocks deleted element 74 to the blocks written element 72 is also stored within the segment metadata 66 for each segment number 68. Higher ratios 76 tend to correspond to more highly fragmented segments.

Garbage collection module 46 operates by repeatedly calculating the ratio 76 for each segment 52 and deciding, based upon the calculated ratios 76, which segments 52 to schedule for defragmenting garbage collection. In some embodiments, whenever a ratio 76 for a given segment 52 exceeds a threshold value, that segment 52 is scheduled for defragmenting garbage collection. For example, in an environment in which a lack of fragmentation is desired at the expense of speed, a threshold value of 0.2 (20% fragmentation) may be used, while in an environment in which speed is prioritized heavily, a threshold value of 0.8 (80% fragmentation) may be used. In some embodiments, even once a particular segment 52 is scheduled for defragmenting garbage collection, certain segments 52 may be prioritized over other segments for defragmenting garbage collection by assigning more highly fragmented segments 52 to be scheduled first.

Figure 2A:
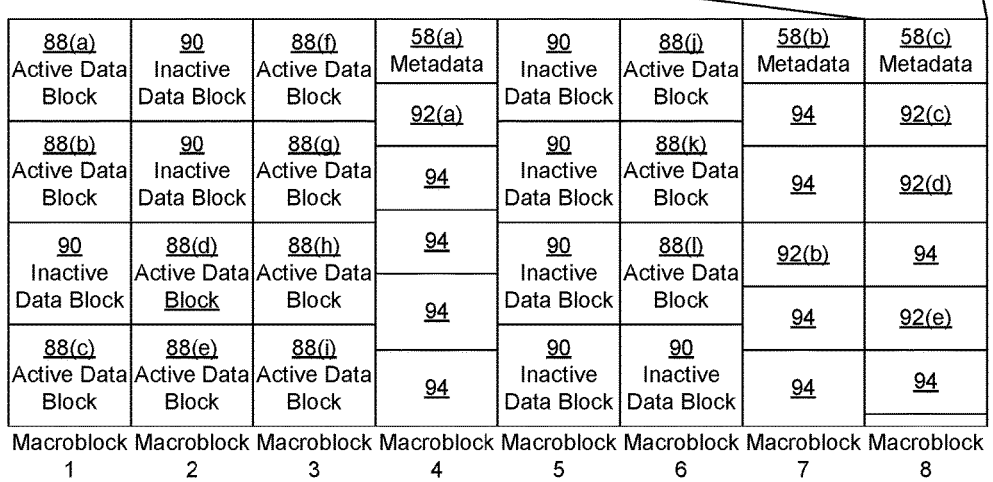
FIG. 2A depicts an example block layout at a first time for use in conjunction with various embodiments.

The process of defragmenting garbage collection may be illustrated with respect to FIGS. 2A and 2B.

FIG. 2A illustrates a layout of a particular first segment 52 and its associated macroblocks 54, 60 just prior to defragmenting garbage collection. First segment 52 with segment number 68(a) has respective macroblock map 70(a), which is depicted in FIG. 2A. The macroblock map 70(a) indicates that the first segment 52 is made up of macroblocks 1-8, sequentially. Macroblocks 54 numbered 1-8 are illustrated as being populated with both active and inactive blocks 56, 57, while macroblocks 60 numbered 9-16 are shown as being free.

Thus, macroblock 1, which is configured to contain uncompressed data blocks 56, contains three active data blocks 88(a), 88(b), and 88(c) together with one inactive (deleted or rewritten) data block 90. Similarly, macroblock 2, which is also configured to contain uncompressed data blocks 56, contains two active data blocks 88(d) and 88(e) together with two inactive data blocks 90, and macroblock 6, which is also configured to contain uncompressed data blocks 56, contains three active data blocks 88(f), 88(g), and 88(h) together with one inactive data block 90. Macroblock 5, which is configured to contain uncompressed data blocks 56, now contains no active data blocks 88, but is rather entirely made up of inactive data blocks 90.

Macroblocks 4, 7, and 8 are configured to contain compressed data blocks 57 of varying sizes following metadata headers 58. However, as depicted, many of the compressed data blocks 57 within macroblocks 4, 7, and 8 are inactive compressed blocks 94. Only a few active compressed data blocks 92 (depicted as active compressed data block 92(a) within macroblock 4, active compressed data block 92(b) within macroblock 7, and active compressed data blocks 92(c), 92(d), 92(e) within macroblock 8) remain.

FIG. 2A also illustrates example metadata header 58(c) for macroblock 8 in detail. Metadata header 58(c) includes a map of the sizes of the compressed blocks 57 within macroblock 8. This map has as many elements as permissible compressed blocks 57 are allowed within a given macroblock 52. In one embodiment, up to 63 compressed blocks are allowed within a macroblock 54. Thus, macroblock map 58(c) would have 63 elements. As depicted, each macroblock is 32 kilobytes in size (although, in other embodiments, other fixed sizes may be used), making each uncompressed block 56 eight kilobytes in size. Thus, each compressed block 57 must be smaller than eight kilobytes in size, and there must be at least five (i.e., more than four) compressed blocks 57 in any macroblock 54 configured to store compressed blocks 57. Thus, each element of the macroblock map should be able to store a size value up to 8,191 bytes, which would require 13 bits (assuming a single byte resolution for the size). Thus, in one embodiment, metadata header 58(c) includes 63 13-bit elements. In other embodiments, for ease of calculation, each element may be a short integer having 16 bits, so metadata header 58(c) includes 63 16-bit elements, which takes up to 126 bytes. Thus, in one embodiment the size of each metadata header 58 is fixed at one kilobyte (leaving room for other metadata), leaving 31 kilobytes available for compressed data blocks 57. Since macroblock 8 contains five compressed data blocks 57, only the first five elements of the metadata header 58(c) contain size values. As depicted, these first five values are 6,144 bytes, 6,656 bytes, 6,144 bytes, 6,144 bytes, and 6,144 bytes, in sequence. Since these values only sum to 30.5 kilobytes, there is an extra 512 bytes of unused space at the end of macroblock 8.

FIG. 2B illustrates a layout of a new second segment 52 and its associated macroblocks 54, 60 just after defragmenting garbage collection of the first segment 52 (defined by macroblock map 70(a) from FIG. 2A). Second segment 52 with segment number 68(b) has respective macroblock map 70(b). The macroblock map 70(b) indicates that the second segment 52 is made up of macroblocks 9, 10, 3, and 11, sequentially. Macroblocks 54 numbered 3 and 9-11 are illustrated as being populated with active blocks 56, 57, while macroblocks 60 numbered 1, 2, 4-8, and 12-16 are shown as being free. This is because active data blocks 88(a)-88(h) from macroblocks 1, 2, and 6 were compacted into just two new macroblocks 9 and 10 in the defragmenting garbage collection process, while active compressed data blocks 92(a)-92(e) from macroblocks 4, 7, and 8 were compacted into just one new macroblock 11 (with new metadata header 58(d) shown in detail). Because macroblocks 1, 2, 4, and 6-8 were compacted, these macroblocks were able to be freed. In addition, because macroblock 5 contained only inactive data blocks 90 prior to compaction, macroblock 5 was also able to be freed. However, since macroblock 3 did not contain any inactive data blocks 90, 92, but only active data blocks 88(f)-88(i), macroblock 3 is maintained in place, but transferred to the new unfragmented second segment 52 with segment number 70(b). Because inactive data has been removed (or, more accurately, not transferred), the second segment 52 has empty positions for additional macroblocks 54 to be inserted from the pool of free macroblocks 60 as new data is written by applications 42.

It should be understood that in order to efficiently pack variable-sized compressed blocks 57 from an initial set of macroblocks 54 into one or more new macroblocks 54, efficient bin-packing algorithms may be used. Examples of such efficient bin-packing algorithms may be found in "LOWER BOUNDS AND REDUCTION PROCEDURES FOR THE BIN PACKING PROBLEM" BY Silvano Martello and Paolo Toth, published in Discrete Applied Mathematics 28 (1990) at pages 59-70, published by Elsevier Science Publishers B.V. (North-Holland), the entire contents and teachings of which are hereby incorporated by reference herein.

FIG. 3 illustrates an example method 100 according to various embodiments for defragmenting garbage collection in a DSS 32. It should be understood that any time a piece of software, such as, for example, storage application 44 or garbage collection module 46, is described as performing a method, process, step, or function, in actuality what is meant is that a computing device (e.g., DSS 32) on which that piece of software 44, 46 is running performs the method, process, step, or function when executing that piece of software on its processor 36.

It should be understood that, within FIG. 3, steps 110 and 140 are dashed because they are optional and not fundamental to method 100. In preliminary step 110 of method 100, storage application 44 writes data blocks (e.g. 56, 57) to a storage device (e.g., primary persistent storage 40), pluralities of the blocks 56, 57 being organized into macroblocks 54, the macroblocks 54 having a first fixed size (e.g., 32 kilobytes, 64 kilobytes, or 1 megabyte), pluralities of the macroblocks 54 being organized into segments 52, segments having a second fixed size (e.g., 256 kilobytes, 2 megabytes, or 128 megabytes). As this is done, various sub-steps may also be performed.

In sub-step 111, as each additional data block 56, 57 is written to a macroblock 54 of a segment 52 by storage application 44, storage application 44 (in some embodiments, through the action of garbage collection module 46) increments a counter of the blocks written element 72 for that segment 52 within metadata 50 within memory 38, as described above.

In sub-step 113, as each additional data block 56, 57 is written to a macroblock 54 by storage application 44, storage application 44 updates the block-use map element 84 for that macroblock 54 within metadata 50 within memory 38 by marking that block 56, 57 as active, as described above.

In sub-steps 115-117, as each additional data block 56, 57 is written to a macroblock 54 by storage application 44, storage application 44 updates the backpointer map element 86 for that macroblock 54.

In particular, in sub-step 115, storage application 44 assigns a unique address to the newly-written data block 56, 57, the unique address identifying the macroblock 54 into which that block 56, 57 is organized and a position of the block 56, 57 within the macroblock 54. For example, the unique address may be a 64-bit value including the 33 or 37 bits of the macroblock number 80 and 6 bits of the block number within the macroblock 54 (recalling that, in some embodiments, there may be up to 63 compressed blocks 57 per macroblock 54).

In sub-step 116, storage application 44 sends the unique address for the newly-written data block 56, 57 to the application 42 which was responsible for writing that block 56, 57. In sub-step 117, which may be performed in parallel with sub-steps 115 and 116, storage application 44 stores, at an offset associated with the newly-written data block within the macroblock 54 in the backpointer map element 86 for the macroblock 54, a backpointer to the application 42 which was responsible for writing that block 56, 57, as described above.

In step 120, as the storage application 44 deletes or overwrites blocks 56, 57 on primary persistent storage 40, storage application 44 marks those blocks as deleted. In sub-step 121, storage application 44 (in some embodiments, through the action of garbage collection module 46) increments a counter of the blocks deleted element 74 for the respective segment 52 within metadata 50 within memory 38, as described above.

In sub-step 123, as each additional data block 56, 57 is deleted or rewritten from a macroblock 54 by storage application 44, storage application 44 updates the block-use map element 84 for that macroblock 54 within metadata 50 within memory 38 by marking that block 56, 57 as inactive, as described above.

In step 130, garbage collection module 46 computes a ratio 76 of storage marked as deleted as compared to storage written within a segment 52. Typically, this is done by dividing the counter of the blocks deleted element 74 by the counter of the blocks written element 72 for a given segment 52. However, in some embodiments, instead of using the numbers of blocks written and deleted, the numbers of bytes written and deleted or some other measures may be used.

In sub-step 131, it is indicated that step 130 is performed repeatedly for each segment 52 upon completing the ratio computation for all of the active segments 52. Alternatively, in sub-step 133, it is indicated that step 130 is performed for a given segment 52 after every n write and delete operations (combined) performed on that segment. For example, in one embodiment, n is equal to the maximum number of compressed blocks 57 allowed per segment (e.g., 63).

In some embodiments, garbage collection module 46 performs optional step 140, in which certain segments 52 with particularly high ratios 76 are prioritized for fragmenting garbage collection. Thus, either the ratios 76 are saved for each segment 52 within segment metadata 66 and compared or any segment 52 with a high enough ratio 76 (above a very high threshold) is prioritized.

In step 150, upon the calculated ratio 76 for a given segment 52 exceeding a threshold (and subject to any prioritization from step 140), garbage collection module 46 performs a garbage collection operation on the segment 52. This step may be accomplished through sub-steps 151-157.

In sub-step 151, garbage collection module 46 identifies macroblocks 54 within the segment 52 (on which defragmentation is being performed) that contain at least one block 56, 57 marked as deleted. This may be accomplished by counting the number of zero entries within the block use map element 84 for each macroblock 54 of the segment 52 under consideration. In the case of a macroblock 54 containing uncompressed blocks 56, only the first few entries of the block use map element 84 (corresponding to the fixed number of uncompressed blocks 56 that fit within a macroblock 54) are considered in this count. In the case of a macroblock 54 containing compressed blocks 57, only the entries of the block use map element 84 for which a block size has been defined are considered in this count. However, in some embodiments, all macroblocks 54 containing compressed blocks 57 are identified by sub-step 151, allowing the constituent compressed blocks 57 to be repacked most efficiently.

In sub-step 153, garbage collection module 46 copies active data blocks 88, 92 which have not been marked as deleted within the macroblocks 54 identified in sub-step 151 to a new macroblock 54 allocated from the pool of free macroblocks 60. This is repeated until all active data blocks 88, 92 which have not been marked as deleted within the macroblocks 54 identified in sub-step 151 have been copied to one or more new macroblocks 54.

In sub-step 155, upon copying the active data blocks in sub-step 153, the backpointer map elements 86 for the new macroblocks 54 must be created. Thus, a new respective unique address is assigned to the copied active data blocks 88, 92 based on their new respective locations, the new unique address is sent to the respective application 42 responsible for writing each copied active data block 88, 92, and the backpointer to the respective application 42 is saved to the appropriate offset within the backpointer map element 86 of the new macroblock 54.

In sub-step 157, the macroblocks 54 which were identified in sub-step 151 may be freed to the pool of free macroblocks 60, since the remaining active data blocks 88, 92 therein have now been moved to a new macroblock 54.

Finally (not depicted), the macroblock map element 70 for the segment 52 being compacted is updated to reflect the new macroblocks 54 therein.

Thus, techniques have been described for defragmenting garbage collection in a DSS 32. This is accomplished by organizing macroblocks 54 into larger segments 52, maintaining metadata 50 about writes 72 and deletions 74 performed on each segment 52, and performing a data compaction feature (step 150) on macroblocks 54 of a segment 52 when its metadata 50 indicates that it is highly fragmented.

3. Metadata Structures

Other embodiments are directed to improved techniques of managing storage in a data storage system involving compressing a subset of block and macroblock metadata. Advantageously, a data storage system operating according to the improved techniques is able to store more metadata in volatile memory even for huge data objects.

Figure 4A:
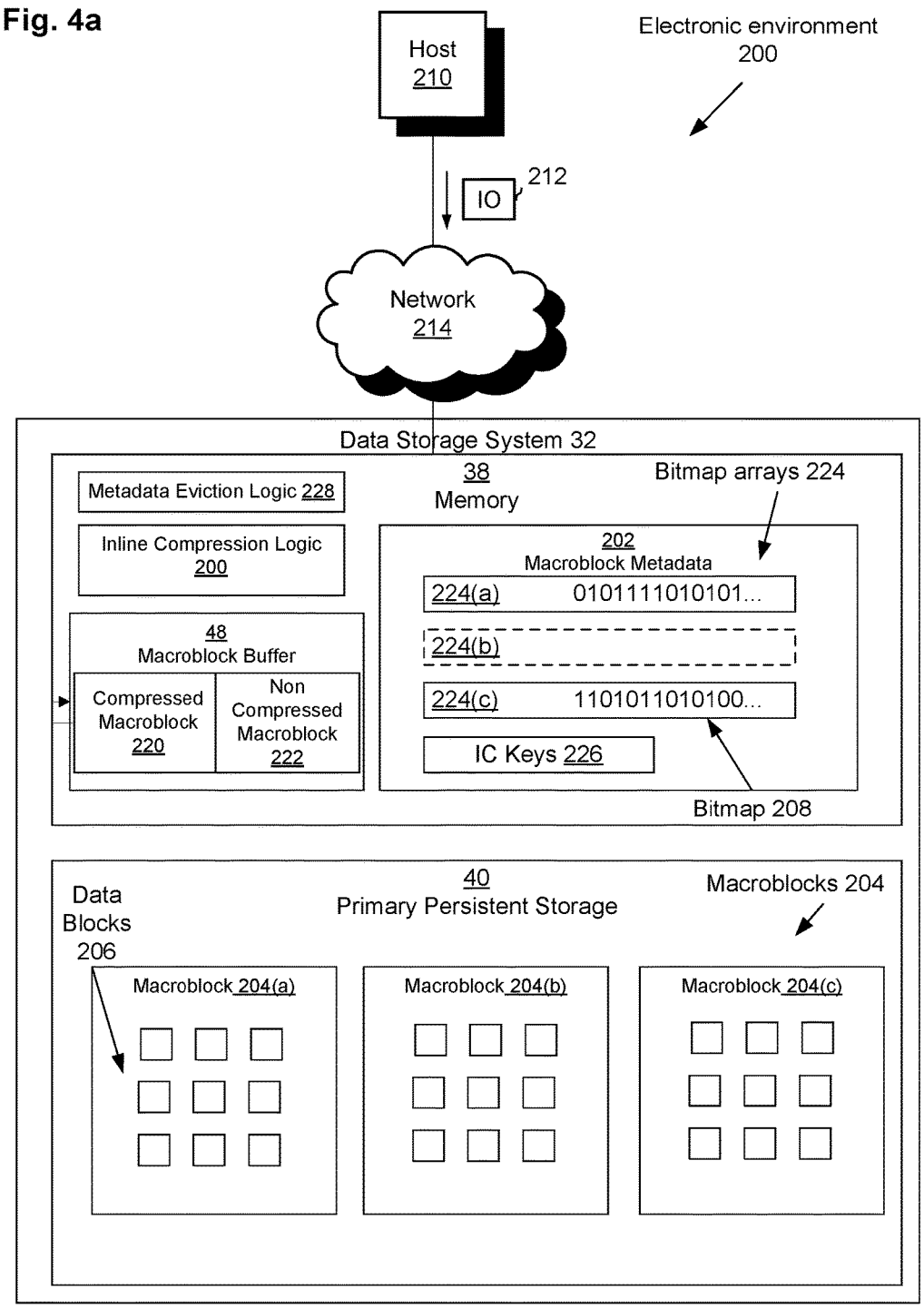
FIG. 4a depicts the example data storage system shown in FIG. 1 according to other embodiments.

FIG. 4a illustrates an example electronic environment 200 for carrying out the above-described improved techniques of managing storage in a data storage system. Electronic environment 200 includes data storage system 32, host computing device 210, and network 214. Here, the host computing device ("host") 210 accesses data storage system 32 over network 214. The data storage system 32 includes the processor 36 and non-volatile storage in the form of a primary persistent storage 40 (see FIG. 1). The storage 180 is provided, for example, in the form of hard disk drives and/or electronic flash drives.

The network 214 can be any type of network or combination of networks, such as a storage area network (SAN), local area network (LAN), wide area network (WAN), the Internet, and/or some other type of network, for example. In an example, the host 210 can connect to the processor 36 using various technologies, such as Fibre Channel (e.g., through a SAN), iSCSI, NFS, SMB 3.0, and CIFS. Any number of hosts 110 may be provided, using any of the above protocols, some subset thereof, or other protocols besides those shown. The processor 36 is configured to receive IO request 212 and to respond to such IO requests 212 by reading from and/or writing to the persistent storage 40 and sending an acknowledgment.

Data storage system 32, as discussed above, includes a primary persistent storage 40 and memory 38; memory 38 includes macroblock buffer 48. As shown in FIG. 4, primary persistent storage 40 stores data blocks 206 in macroblocks such as macroblock 204(a), macroblock 204(b), macroblock 204(c), and so on. Each such macroblock 204 contains a fixed amount of data (e.g., 1 MB, 2 MB, 512 kB, etc.) and represents a contiguous address space in storage. Each macroblock 204 holds either all compressed data blocks 57 or uncompressed data blocks 56. Those macroblocks 204 containing only compressed data blocks include headers 58 (see FIGS. 1 and 2) that provide a map of compressed data block size vs position within those macroblocks 204.

Memory 38, in addition to what was described in connection with FIG. 1, includes an inline compression logic module 200, metadata eviction logic module 228, macroblock metadata 202.

Inline compression logic module 200 in memory 38 is configured to cause processor 36 to perform inline compression operations on data blocks contained in I/O request 112 and macroblock metadata 202 (see metadata 78 in FIG. 1) and determine whether each of these data objects are compressible. For example, if after an inline compression operation, a data object is larger than some threshold size, inline compression logic module 200 causes processor 36 to determine that data object to be incompressible and act on that data object accordingly. Compression may be accomplished using an LZW algorithm, although other compression algorithms may be used.

Metadata eviction logic 228 is configured to cause processor 36 to perform an eviction operation on macroblock metadata 202 to keep the size of macroblock metadata 202 in memory below some maximum. For example, metadata eviction logic 228 may cause processor 36 to evict a bitmap array 224 that satisfies specified criteria. Eviction of a bitmap array 224 may involve writing bitmap array 224 in a macroblock 204 in primary persistent storage 40 and generating a single value that tracks the location in storage 40. In some arrangements, processor 36 may perform an inline compression operation on bitmap array 224 prior to storage in a macroblock 204.

As described in FIG. 1 above, each macroblock 204 has associated macroblock metadata stored in memory 38. As illustrated in FIG. 4,block and macroblock metadata 202 is arranged as structures including bitmap arrays 224 and IC keys 226. (See elements 82 and 84 of macroblock metadata 78 in connection with FIG. 1.) Bitmap arrays 224 each have arrays of bitmaps 208, each bitmap 208 having, e.g., 64 bits, 128 bits, etc, representing block data behavior in a respective macroblock 204. In some arrangements, the arrays of bitmaps 208 in an array 224 are arranged sequentially with respect to offset in storage 40. The first bit of a bitmap 208 indicates whether the respective macroblock 204 contains compressed or uncompressed data blocks. The other bits of bitmap represent whether the data blocks 206 in that macroblock 204 are in use. For example, in a macroblock containing 30 compressed data blocks, the last 33 bits of associated bitmap 208 would indicate compressed data blocks not in use. Other bits of the first 30 bits may also indicate compressed blocks not in use; this may happen when such blocks are deallocated because of deduplication, for example.

IC keys 224 are each bitmaps of a fixed size, e.g., 64 bits. Each IC key 224 represents a location within a particular macroblock of a given data block. For example, in a macroblock 204 containing 63 compressed data blocks, the last six bits of an IC key 224 represent the position of a data block 206 within the macroblock 204, while the first 57 bits represent a location (i.e., offset) of the macroblock 204 in primary persistent storage 40.

Macroblock buffer 48, as described above, provides temporary storage of macroblocks 204 in memory 38. For example, after performing a compression operation on a data block 206 to be written to primary persistent storage 40, processor 36 places the data block 206 into either macroblock 220 or 222 in macroblock buffer 48 according to whether the data block 206 could be compressed. At some point, e.g., when macroblock 220 or 222 in buffer 48 is filled or has been stored in buffer 48 after a long enough period of time, processor 36 evicts macroblock 220 or 222 from buffer 48, i.e., writes its data blocks 206 to primary persistent storage 40 and generates respective bitmaps 208 and IC keys 224.

During an example operation, host 210 sends an I/O request 212 over network 214 containing a request to write a data block 206 to primary persistent storage 40. Upon receipt of data block 206 over network 214, processor 36 performs an inline compression operation on data block 206 according to instructions contained in inline compression logic 200. If processor 36 determines data block 206 to be incompressible, then processor 36 places uncompressed data block in macroblock 222 that contains only uncompressed data blocks. If on the other hand processor 36 determines data block 206 to be compressible, then processor 36 places compressed data block in macroblock 220 that contains only compressed data.

Upon completion of the storage of data blocks in either macroblock 220 or 222, processor 36 generates a respective bitmap 208 and places bitmap 208 in a bitmap array 224. When processor 36 writes macroblock 220 or 222 to primary persistent storage 40, processor 36 generates an IC key 226 for each data block stored in that macroblock.

At some point, processor 36 performs an eviction operation on macroblock metadata 202 to evict bitmap array 224(b) from memory 38. Processor 36 performs a compression operation on bitmap array 224(b) and writes bitmap array in either macroblock 220 or 222 according to whether bitmap array 224(b) is compressible. Upon writing to primary persistent storage 40 the macroblock in which bitmap array 224(b) is stored, processor 36 stores an indicator called a logical block number to macroblock metadata 202 so that bitmap array 224(b) may be recovered if needed later.

FIG. 4b illustrates example block metadata in the form of lookup table 240 residing in memory 38. In this case, lookup table 240 provides a mapping between logical addresses stored in memory 38 to physical addresses in primary persistent storage 40.

FIG. 5 provides further detail of the eviction operation. Specifically, FIG. 5 illustrates a specific data structure called a sparse compressed cache-like (SCCL) array 300 in which macroblock metadata such as bitmap arrays 320 are arranged. SCCL array 300 resides within macroblock metadata 202 within memory 38 and is called "cache-like" because of its property of evicting least-recently-used data from memory 38.

SCCL array 300 includes slots 310(1), 310(2), . . . , 310(N), where N is the number of slots 310 in SCCL array 300. Each slot 310 contains a pointer to a respective bitmap array 320, whether the respective bitmap array 320 is currently present in memory 38 or evicted and written to primary persistent storage 40. For example, if the bitmap array 320(2) to which respective slot 310(2) points has been evicted from memory 38, then slot 310(2) has a pointer value of NULL. Otherwise, if the bitmap array 310(1) to which respective slot 310(1) points is currently resident in memory 38, then slot 310(1) has a pointer value reflecting an address in memory at which bitmap array 320(1) resides.

To determine the conditions under which processor 36 evicts bitmap arrays 320 from memory 48, slots 310 and SCCL array 300 each contain attributes whose values determine those conditions. For example, metadata eviction logic 228 (FIG. 4) might impose a condition that the least-recently-used bitmap array 320 having dirty data, i.e., data that is not written to primary persistent storage 40, is to be evicted.

To effect the evaluation of whether such a condition is met, slots 310 each contain a timestamp attribute and an isDirty attribute. The timestamp attribute of a slot 310 is a number indicating a time at which the most recent access to the respective bitmap array 320 to which slot 310 points. In some arrangements, such a time is simply a long integer and reflects a place in a sequence of bitmap array accesses throughout SCCL array 300. In this case, SCCL array 300 has a global timestamp attribute that increments each time a bitmap array within the SCCL array is accessed. For example, suppose that the global timestamp is initially zero upon creation of SCCL array 300. Upon an access of a bitmap array 320(3), processor 36 increments the global timestamp by 1 so the value of the global timestamp is 1. Processor 36 then assigns the timestamp attribute of slot 310(3) the value of the global timestamp, or 1. Upon subsequent access of a bitmap array 320(1), processor 36 increments the global timestamp by 1 so the value of the global timestamp is 2. Processor 36 then assigns the timestamp attribute of slot 310(1) the value of the global timestamp, or 2. In this way, processor 36 may identify the least-recently-used bitmap array using a small amount of memory.

The isDirty attribute of a slot 310 may be a Boolean value that indicates whether the bitmap array 320 to which the slot points has dirty data, i.e., data that is not written to primary persistent storage 40. For example, when processor 36 creates a new bitmap array 320 and stores it in SCCL array 300 at slot 310, processor 36 assigns the isDirty attribute of that slot to TRUE because data in new bitmap array 320 has not yet been written to primary persistent storage 40. The isDirty attribute of a slot may be set to FALSE when, for example, it points to a bitmap array 320 that has been recovered from primary persistent storage 40 but has not yet been changed.

The slots 310 have one more attribute that is used to recover bitmap arrays from primary persistent storage 40, a logical block number (LBN). When processor 36 evicts a bitmap array from memory 38, Processor 36 generates a LBN that indicates the macroblock in which the bitmap array is stored. Processor 36 then uses the LBN to locate the evicted bitmap array for recovery.

Figure 6:
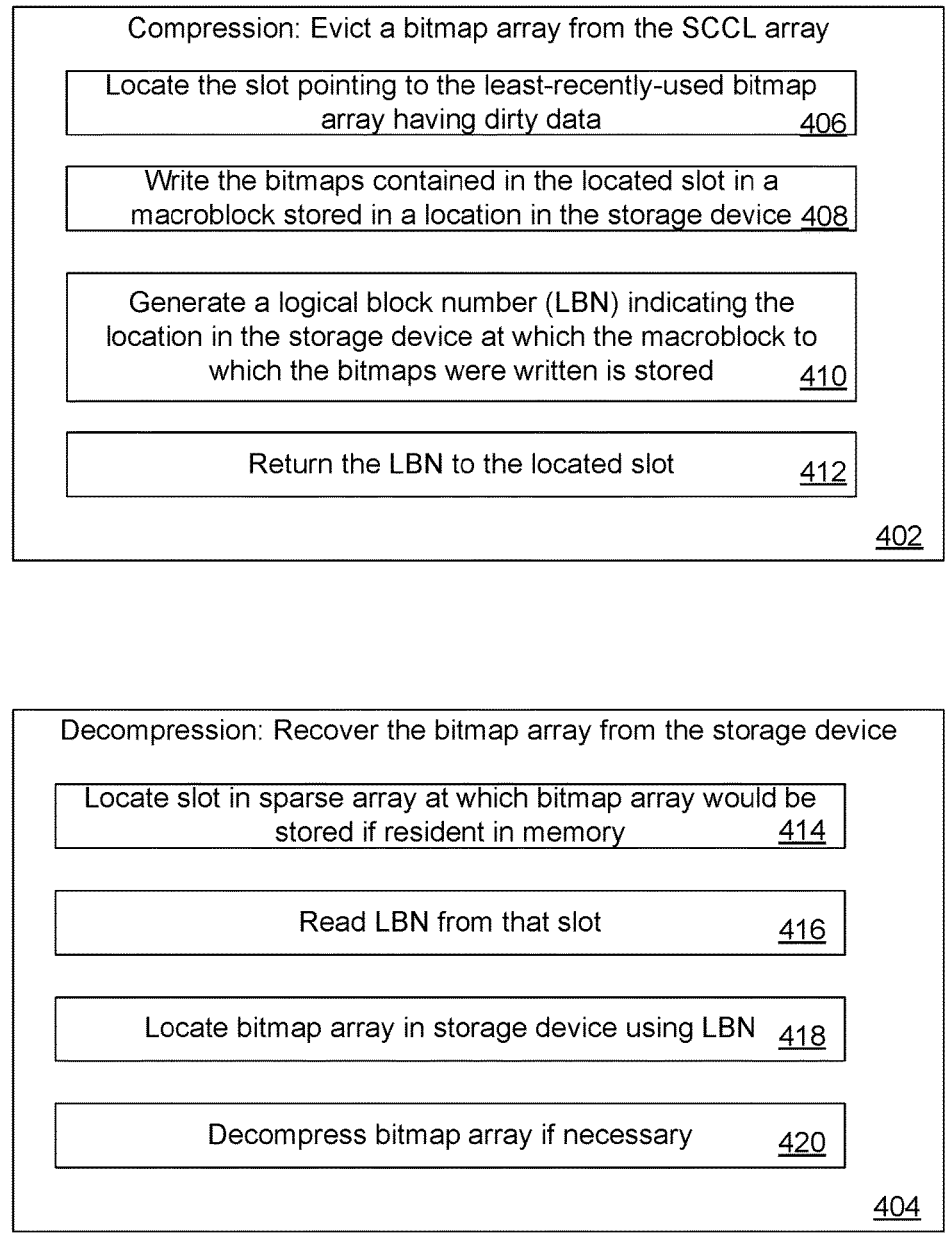
FIG. 6 depicts an example process of evicting and recovering macroblock metadata from volatile memory.

FIG. 6 illustrates an example process 400 by which bitmap arrays 320 of SCCL array 300 are compressed and decompressed. At 402, processor 36 evicts bitmap array 320 from SCCL array 300 to effect compression of the SCCL array 300. At 404, processor 36 recovers the bitmap array from the primary persistent storage 40. Details of each of these actions are as follows.

To effect compression, at 406 processor 36 locates the slot 310 having the least-recently-used bitmap array 320 having dirty data. For example, each occurrence of a change in the value of the global timestamp of the SCCL array 300, processor 36 performs a comparison operation to locate the slot having the smallest value of its timestamp attribute that has the value of its isDirty attribute set to TRUE.

At 408, processor 36 writes to primary persistent storage 40 the bitmaps of the bitmap array 320 pointed to by the slot 310 having the smallest value of its timestamp attribute that has the value of its isDirty attribute set to TRUE. For example, processor 36 locates a macroblock 204 having available space for bitmap array 320. In some arrangements, prior to writing to primary persistent storage 40, processor 36 performs a compression operation on the bitmaps of the bitmap array within macroblock buffer 48.

At 410, processor 36 generates a LBN based on the macroblock 204 in which the bitmaps of bitmap array 320 is stored. For example, the LBN is a 64-bit integer that reflects a unique identifier of macroblock 204 into which the bitmaps are written.

At 412, processor 36 returns the generated LBN to the located slot as the value of an LBN attribute of that slot. At this point, the pointer to the bitmap array 320 pointed of the located slot is set to NULL. In this way, processor 36 has compressed SCCL array 300 by making the space formerly occupied by bitmap array 320 available as a buffer.

To effect decompression of SCCL array 300 by recovering the bitmap array written to primary persistent storage 40, at 414, processor 36 locates the slot 310 that would have pointed to bitmap array 320 had it not been evicted. For example, such a slot 310 may be identified based on attributes of the slot such as the timestamp. At 416, processor 36 reads the value of the LBN attribute of that slot 310. At 418, processor 36 locates the macroblock in which bitmap array 320 is stored using the value of the LBN attribute read from slot 310. In some arrangements in which bitmap array 320 had been compressed, at 420, processor 36 decompresses the bitmap array.

It should be understood that the slot 310 that would have pointed to bitmap array 320 had it not been evicted might currently point to another bitmap array. In this case, processor 36 may create a new slot and location in memory 38 for the recovered bitmap array 320.

It should also be understood that the improved techniques may be applied in cases of write splits in the presence of shared data blocks. For example, a file system that supports deduplication may share a data block referenced by a file. In many cases, the file system supports backpointers to which the indirect blocks of the file may point in order to simplify the task of locating shared blocks. When a file pointing to a shared block via a backpointer receives a request to overwrite the shared block, the file system causes a processor to copy the data stored in the shared block to a new location and update the backpointer to point to the new location.

Figure 7:
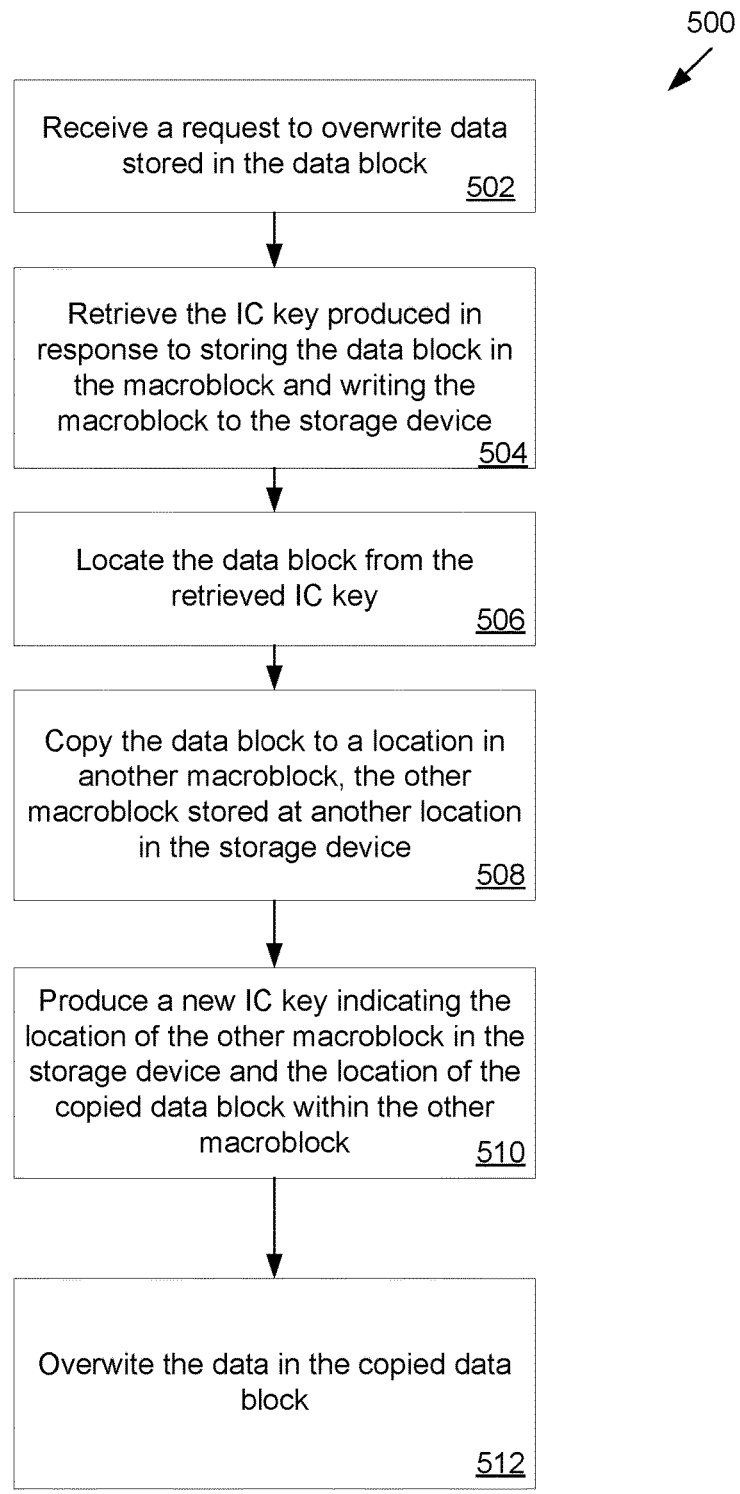
FIG. 7 depicts an example process of overwriting data according to various embodiments.

FIG. 7 illustrates an example process 500 of performing a write split of a data block using the IC key 226. At 502, processor 36 receives a request to overwrite data stored in a data block within a macroblock 204. At 504, processor 36 retrieves the IC key 226 that provides the location of the data block in primary persistent storage 40, i.e, the macroblock 204 and position within the macroblock 204.

At 506, processor 36 locates the data block using the IC key. For example, the location within a macroblock 204 that holds only compressed data may be found from the last 6 bits of the IC key 226. When the data blocks 206 within macroblock 204 are compressed, however, processor 36 checks the macroblock header to find the precise location of the compressed data block within the macroblock 204.

At 508, processor 36 copies the data in the data block to another location in primary persistent storage 40. In the case that the data block was compressed, processor 36 decompresses the data block prior to copying.

At 510, processor 36 updates the value of the IC key to reflect the new location in disk of the data block.

At 512, processor 36 overwrites the data in the data block at the new location. In some arrangements, processor 36 performs a compression operation on the overwritten data and relocates the data to a compressed or uncompressed macroblock based on the compressibility of the overwritten data. In this case, the IC key is updated after overwriting as the position of the overwritten data block in primary persistent storage 40 is not clear until a compression operation has been performed on overwritten data.

Figure 8:
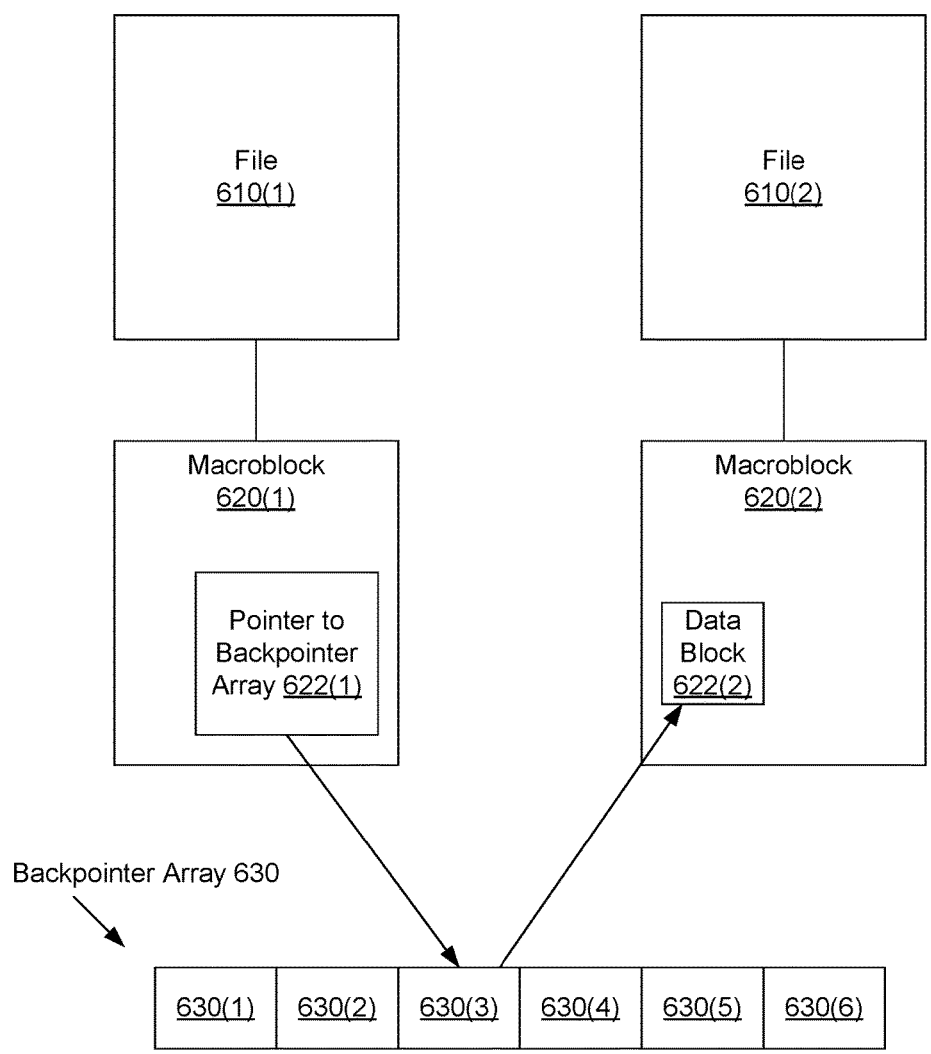
FIG. 8 depicts an example backpointer array according to various embodiments.

FIG. 8 illustrates an example backpointer array 630 used to locate shared data blocks. Backpointer array 630 is an array of fixed size that stores backpointers. Each backpointer of array 630 is pointed to by a block pointer stored in an indirect block, which in turn is pointed to by a block pointer of an inode of a file 610. In this case, an indirect block may point to an offset within backpointer array 630 as a way to point to a backpointer.

A backpointer of backpointer array 630 points to a data block pointed to by an indirect block of another file 620; such a pointing relationship may be, as described above, as result of a deduplication operation. Thus, any overwriting of the data block results in a write split as described in connection with FIG. 7.

In some arrangements, backpointers stored in backpointer array 630 may contain redundant information. For example, some backpointers in adjacent elements of backpointer array 630 may differ only in offset values. In this case, backpointer array 630 may be compressed in the same manner (e.g., LZW algorithm) as other block metadata described herein.

FIG. 9 illustrates an example method 700 of managing storage in a data storage system according to the improved techniques described herein. At 702, SP 28 writes data blocks to a storage device of the data storage system, pluralities of the data blocks being organized into macroblocks having a fixed size. At 704, processor 36 generates macroblock metadata describing the data blocks organized in the macroblocks. At 706, processor 36 compresses a subset of the macroblock metadata. At 708, processor 36, in response to an access request, decompressing a portion of the subset of the macroblock metadata that was compressed. At 710, processor 36 provides access to data blocks organized in the macroblocks using the decompressed portion of the subset of the macroblock metadata.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc., for example memory 38 in FIG. 4) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of managing storage in a data storage system, the method comprising:

writing data blocks to a storage device of the data storage system, pluralities of the data blocks being organized into macroblocks having a fixed size;

generating macroblock metadata describing the data blocks organized in the macroblocks;

compressing a subset of the macroblock metadata;

in response to an access request, decompressing a portion of the subset of the macroblock metadata that was compressed; and providing access to data blocks organized in the macroblocks using the decompressed portion of the subset of the macroblock metadata.

2. A method as in claim 1, further comprising:

generating block metadata describing the data blocks written to the storage device;

compressing a subset of the block metadata;

in response to an access request, decompressing a portion of the subset of the block metadata that was compressed; and providing access to data blocks using the decompressed portion of the subset of the block metadata and the decompressed portion of the subset of the macroblock metadata.

3. A method as in claim 2, further comprising:

prior to writing the data blocks to the storage device, receiving a data block to be written to the storage device, performing an inline compression operation on the data block; and storing the data block in a macroblock in a macroblock buffer;

wherein generating the macroblock metadata includes producing a bitmap of a set of bitmaps in response to storing the data block in the macroblock, a bitmap of the set of bitmaps indicating (i) whether a macroblock contains compressed data and (ii) which data blocks organized in the macroblock are being used.

4. A method as in claim 3, wherein compressing the subset of the macroblock metadata includes:

writing the subset of the macroblock metadata to the macroblock buffer; and performing the inline compression operation on the macroblock metadata; and wherein compressing the subset of the block metadata includes performing the inline compression operation on the block metadata.

5. A method as in claim 3, wherein a portion of the block and macroblock metadata is arranged in a sparse array of slots, each of the slots of the sparse array having a pointer, the value of the pointer being one of (i) a pointer to a bitmap-array-in-use or (ii) a null pointer, the bitmap-array-in-use containing bitmaps of the set of bitmaps, the null pointer indicating an available slot; and wherein writing the subset of the macroblock metadata to the location in the storage device includes:

identifying a slot pointing to a least-recently-used bitmap array;

writing the bitmaps contained in the least-recently-used bitmap array to the location in the storage device; and setting the pointer of the identified slot to the null pointer.

6. A method as in claim 5, wherein each of the slots of the sparse array includes a timestamp indicating the most recent time at which one of bitmaps of the bitmap array to which that slot points was written to;

wherein each of the slots of the sparse array having a pointer to a bitmap array in use further includes a dirty data indicator indicating whether the bitmap array contains data that is not stored in the storage device; and wherein identifying the slot pointing to the least-recently-used bitmap array includes finding the slot of the array of slots with the oldest timestamp having a dirty data indicator indicating that the bitmap array contains data not stored in the storage device.

7. A method as in claim 6, wherein the method further comprises:

writing, in a macroblock stored in a location in the storage device, the bitmaps contained in the slot pointing to the least-recently-used bitmap array and having the dirty data indicator indicating that the bitmap array contains data that is not stored in the storage device;

wherein the method further comprises generating a logical block number indicating the location in the storage device at which the macroblock to which the bitmaps were written is stored; and wherein decompressing the portion of the compressed subset of the macroblock metadata includes accessing the compressed bitmap array at the location indicated by the logical block number returned to the slot.

8. A method as in claim 7, wherein generating the macroblock metadata further includes, in response to storing the data block in the macroblock and writing the macroblock to the storage device, producing an inline compression (IC) key indicating (i) a location in the storage device where the macroblock that contains the data block was written and (ii) a location of the data block within the macroblock that contains the data block.

9. A method as in claim 8, further comprising:

receiving a request to overwrite data stored in the data block;

retrieving the IC key produced in response to storing the data block in the macroblock and writing the macroblock to the storage device;

locating the data block from the retrieved IC key;

copying the data block to a location in another macroblock, the other macroblock stored at another location in the storage device;

producing a new IC key indicating the location of the other macroblock in the storage device and the location of the copied data block within the other macroblock; and overwriting the data in the copied data block.

10. A method as in claim 8, wherein the data stored in the data block is referenced by a first file system data structure;

wherein the method further comprises performing a sharing operation to share the data stored in the data block with a second file system data structure, wherein performing the sharing operation includes:

generating a backpointer that identifies another data block that stores the data, the other data block being reference by the second file system data structure; and storing the backpointer in a backpointer array; and wherein compressing the subset of the block metadata includes:

compressing a subset of the backpointer array;

writing the compressed subset of the backpointer array to a macroblock stored in the storage device; and in response to the writing, returning a logical block number to a slot of the sparse array of slots.

11. A method as in claim 10, wherein decompressing the portion of the subset of the block metadata that was compressed includes:

reading the logical block number to find the macroblock in which the compressed subset of the backpointer was written, and decompressing the compressed subset of the backpointer; and wherein providing access to the data blocks organized in the macroblocks using the decompressed portion of the subset of the block metadata includes reading a backpointer of the backpointer array to find the data stored in the other data block.

12. A computer program product comprising a non-transitory computer-readable storage medium storing a set of instructions which, when performed by a computer device, cause the computing device to perform the following operations:
    writing data blocks to the storage medium, pluralities of the data blocks being organized into macroblocks having a fixed size;
    in response to writing the data blocks, generating macroblock metadata describing the data blocks organized in the macroblocks;
    compressing a subset of the macroblock metadata;
    in response to an access request, decompressing a portion of the subset of the macroblock metadata that was compressed; and
    providing access to data blocks organized in the macroblocks using the decompressed portion of the subset of the macroblock metadata.

13. A computer program product as in claim 12, wherein the set of instructions further cause the computing device to perform the following operations:
    generate block metadata describing the data blocks written to the storage device;
    compress a subset of the block metadata;
    in response to an access request, decompress a portion of the subset of the block metadata that was compressed; and
    provide access to data blocks using the decompressed portion of the subset of the block metadata and the decompressed portion of the subset of the macroblock metadata.

14. A computer program product as in claim 13, wherein the set of instructions further cause the computing device to perform the following operations:
    prior to writing the data blocks to the storage device, receiving a data block to be written to the storage device, performing an inline compression operation on the data block; and
    storing the data block in a macroblock in a macroblock buffer;
    wherein generating the macroblock metadata includes producing a bitmap of a set of bitmaps in response to storing the data block in the macroblock, a bitmap of the set of bitmaps indicating (i) whether a macroblock contains compressed data and (ii) which data blocks organized in the macroblock are being used.

15. A computer program product as in claim 14, wherein compressing the subset of the macroblock metadata includes:
    writing the subset of the macroblock metadata to the macroblock buffer; and
    performing the inline compression operation on the macroblock metadata; and
    wherein compressing the subset of the block metadata includes performing the inline compression operation on the block metadata.

16. A computer program product as in claim 14, wherein a portion of the block and macroblock metadata is arranged in a sparse array of slots, each of the slots of the sparse array having a pointer, the value of the pointer being one of (i) a pointer to a bitmap-array-in-use or (ii) a null pointer, the bitmap-array-in-use containing bitmaps of the set of bitmaps, the null pointer indicating an available slot; and
    wherein writing the subset of the macroblock metadata to the location in the storage device includes:
        identifying a slot pointing to a least-recently-used bitmap array;
        writing the bitmaps contained in the least-recently-used bitmap array to the location in the storage device; and
        setting the pointer of the identified slot to the null pointer.

17. A computer program product as in claim 16, wherein each of the slots of the sparse array includes a timestamp indicating the most recent time at which one of bitmaps of the bitmap array to which that slot points was written to;
    wherein each of the slots of the sparse array having a pointer to a bitmap array in use further includes a dirty data indicator indicating whether the bitmap array contains data that is not stored in the storage device; and
    wherein identifying the slot pointing to the least-recently-used bitmap array includes finding the slot of the array of slots with the oldest timestamp having a dirty data indicator indicating that the bitmap array contains data not stored in the storage device.

18. A computer program product as in claim 17, wherein the set of instructions further cause the computing device to perform the following operations:
    writing the bitmaps contained in the slot pointing to the least-recently-used bitmap array and having the dirty data indicator in a macroblock stored in a location in the storage device;
    wherein the method further comprises returning to the slot a logical block number indicating the location in the storage device at which the macroblock to which the bitmaps were written is stored; and
    wherein decompressing the portion of the compressed subset of the macroblock metadata includes accessing the compressed bitmap array at the location indicated by the logical block number returned to the slot.

19. A computer program product as in claim 18, wherein generating the macroblock metadata further includes, in response to storing the data block in the macroblock and writing the macroblock to the storage device, producing an inline compression (IC) key indicating (i) a location in the storage device where the macroblock that contains the data block was written and (ii) a location of the data block within the macroblock that contains the data block.

20. An apparatus, comprising:
    persistently-backed system memory;
    a data storage device; and
    processing circuitry coupled to the memory, the processing circuitry being constructed and arranged to perform the following operations:
        writing data blocks to a storage device, pluralities of the data blocks being organized into macroblocks having a fixed size;
        in response to writing the data blocks, generating macroblock metadata describing the data blocks organized in the macroblocks;
        compressing a subset of the macroblock metadata;
        in response to an access request, decompressing a portion of the subset of the macroblock metadata that was compressed; and
        providing access to data blocks organized in the macroblocks using the decompressed portion of the subset of the macroblock metadata.

* * * * *